(12) United States Patent
Roberts et al.

(10) Patent No.: US 11,195,002 B2
(45) Date of Patent: Dec. 7, 2021

(54) METHOD AND SYSTEM FOR IMAGE BASED OCCUPANCY DETECTION

(71) Applicant: IDEAL Industries Lighting LLC, Sycamore, IL (US)

(72) Inventors: John Roberts, Durham, NC (US); Ronald W. Bessems, Santa Barbara, CA (US); Robert Bowser, Cary, NC (US)

(73) Assignee: Ideal Industries Lighting LLC, Racine, WI (US)

(*) Notice: Subject to any disclaimer, the term of this patent is extended or adjusted under 35 U.S.C. 154(b) by 0 days.

(21) Appl. No.: 16/108,975

(22) Filed: Aug. 22, 2018

(65) Prior Publication Data

US 2020/0065572 A1    Feb. 27, 2020

(51) Int. Cl.
*G06K 9/00* (2006.01)
*H04N 5/345* (2011.01)

(52) U.S. Cl.
CPC ......... *G06K 9/00369* (2013.01); *H04N 5/345* (2013.01)

(58) Field of Classification Search
CPC ................. G06K 9/00369; H04N 5/345
See application file for complete search history.

(56) References Cited

U.S. PATENT DOCUMENTS

| | | | | |
|---|---|---|---|---|
| 6,542,621 B1* | 4/2003 | Brill | ................... | G06K 9/00369 382/103 |
| 8,300,935 B2* | 10/2012 | Distante | ................... | G06T 7/20 382/173 |
| 10,165,650 B1 | 12/2018 | Fini et al. | | |
| 2004/0101162 A1* | 5/2004 | Higaki | ................... | G06T 7/215 382/103 |
| 2008/0087799 A1* | 4/2008 | Sugiyama | ................ | H04N 3/155 250/208.1 |
| 2008/0316327 A1* | 12/2008 | Steinberg | .............. | G06T 3/4038 348/222.1 |
| 2017/0135179 A1 | 5/2017 | Balazs et al. | | |
| 2017/0228874 A1* | 8/2017 | Roberts | ................... | F21S 9/028 |
| 2018/0225834 A1* | 8/2018 | Heikman | ........... | G06K 9/00771 |

(Continued)

FOREIGN PATENT DOCUMENTS

| | | |
|---|---|---|
| JP | 2015061109 A | 3/2015 |
| JP | 2015186155 A | 10/2015 |

OTHER PUBLICATIONS

Invitation to Pay Additional Fees and Partial International Search for International Patent Application No. PCT/US2019,040713, dated Oct. 17, 2019, 17 pages.

(Continued)

*Primary Examiner* — David Bilodeau
(74) *Attorney, Agent, or Firm* — Withrow & Terranova, PLLC

(57) ABSTRACT

An image sensor includes an active pixel array including a number of pixels and image sensor control circuitry configured to perform a read operation only on a subset of the pixels of the active pixel array such that pixels not in the subset remain inactive. By reading out only the subset of pixels in the active pixel array and keeping the remaining pixels inactive, the temperature of the active pixel array may be reduced compared to a conventional read out process, thereby reducing thermal noise in the resulting pixel data.

24 Claims, 14 Drawing Sheets

(56) References Cited

U.S. PATENT DOCUMENTS

2019/0141274 A1* 5/2019 Hizume .............. H04N 5/3745
2019/0289230 A1* 9/2019 Berner ................ H04N 5/379
2019/0309974 A1* 10/2019 Kostrun ............... F24F 11/46

OTHER PUBLICATIONS

International Search Report and Written Opinion for International Patent Application No. PCT/US2019/040713, dated Dec. 10, 2019, 19 pages.
International Preliminary Report on Patentability for International Patent Application No. PCT/US2019/040713, dated Mar. 4, 2021, 12 pages.

* cited by examiner

METHOD AND SYSTEM FOR IMAGE BASED OCCUPANCY DETECTION

FIELD OF THE DISCLOSURE

The present disclosure relates to methods and systems for detecting occupancy using images. In particular, the present disclosure relates to methods and systems for detecting occupancy that increase the efficiency and accuracy of occupancy detection via an image sensor.

BACKGROUND

Modern lighting fixtures often include additional features above and beyond their ability to provide light. For example, many lighting fixtures now include communications circuitry for sending and receiving commands to and from other devices, control circuitry for setting the light output thereof, and sensor circuitry for measuring one or more environmental parameters. Recently, lighting fixtures have begun to incorporate image sensors. Image sensors in lighting fixtures are generally expected to detect occupancy (i.e., the presence of a person) in the area within the field of view of the image sensor. While there are several well-known methods for determining occupancy using an image sensor, these methods are complex and computationally expensive. As a result, lighting fixtures utilizing an image sensor to detect occupancy must include relatively powerful processing circuitry, which consumes additional power and drives up the cost of the lighting fixture. Accordingly, there is a need for systems and methods for detecting occupancy using an image sensor with reduced complexity and computational expense.

SUMMARY

In one embodiment, an image sensor includes an active pixel array including a number of pixels and image sensor control circuitry configured to perform a read operation only on a subset of the pixels of the active pixel array such that pixels not in the subset remain inactive. By reading out only the subset of pixels in the active pixel array and keeping the remaining pixels inactive, the temperature of the active pixel array may be reduced compared to a conventional read out process, thereby reducing thermal noise in the resulting pixel data.

In one embodiment, a method for detecting occupancy from an image sensor includes obtaining pixel data from the image sensor and analyzing the pixel data to determine if a person has entered the field of view of the image sensor. Notably, the pixel data includes pixel values only for a subset of pixels in an active pixel array of the image sensor. By obtaining and analyzing pixel data only for a subset of pixels, the computational expense of determining if a person has entered the field of view of the image sensor may be significantly reduced.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
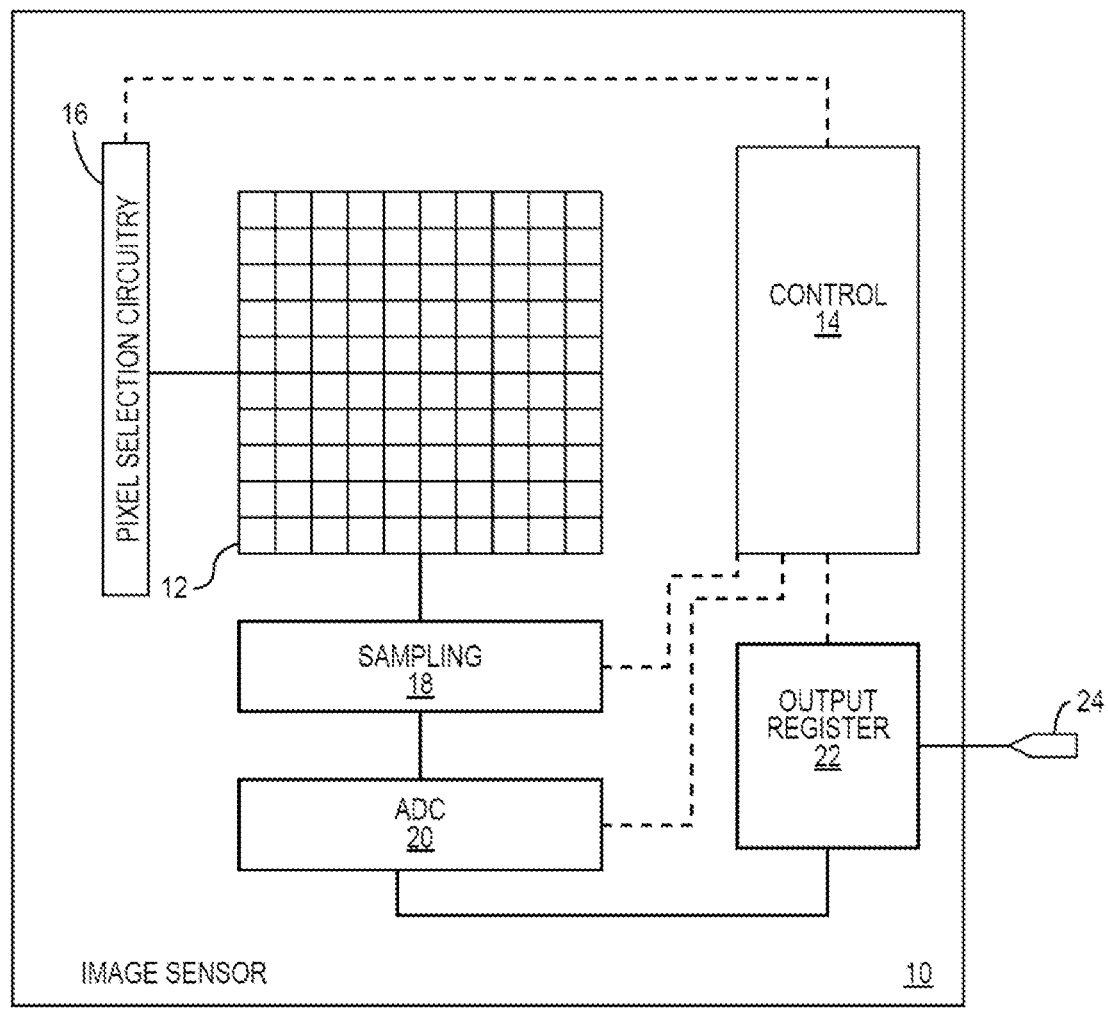
FIG. 1 illustrates an image sensor according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows an image sensor 10 according to one embodiment of the present disclosure. The image sensor 10 includes an active pixel array 12, control circuitry 14, a pixel selection circuitry 16, sampling circuitry 18, analog-to-digital converter circuitry 20, an output register 22, and an output 24. The control circuitry 14 is coupled to each one of the pixel selection circuitry 16, the sampling circuitry 18, the analog-to-digital converter circuitry 20, and the output register 22. The pixel selection circuitry 16 is coupled to the active pixel array 12. The sampling circuitry 18 is coupled between the active pixel array 12 and the analog-to-digital converter circuitry 20. The analog-to-digital converter circuitry 20 is coupled to the output register 22, which is in turn coupled to the output 24.

In operation, the control circuitry 14 provides control signals to each one of the pixel selection circuitry 16, the sampling circuitry 18, the analog-to-digital circuitry 20, and the output register 22 to facilitate capturing an image frame and providing a digitized version thereof at the output 24 of the image sensor 10. The pixel selection circuitry 16 selects one or more pixels in the active pixel array 12 to be reset and/or read out. In a conventional rolling shutter read process, the pixel selection circuitry 16 serially selects rows of pixels in the active pixel array 12 to be reset and subsequently read out one after the other. Selected pixels provide analog signals proportional to an amount of light detected thereby to the sampling circuitry 18. The analog-to-digital converter circuitry 20 digitizes the analog signals from the sampling circuitry 18 into pixel data and provides the pixel data to the output register 22, where it can be retrieved via the output 24.

Figure 2:
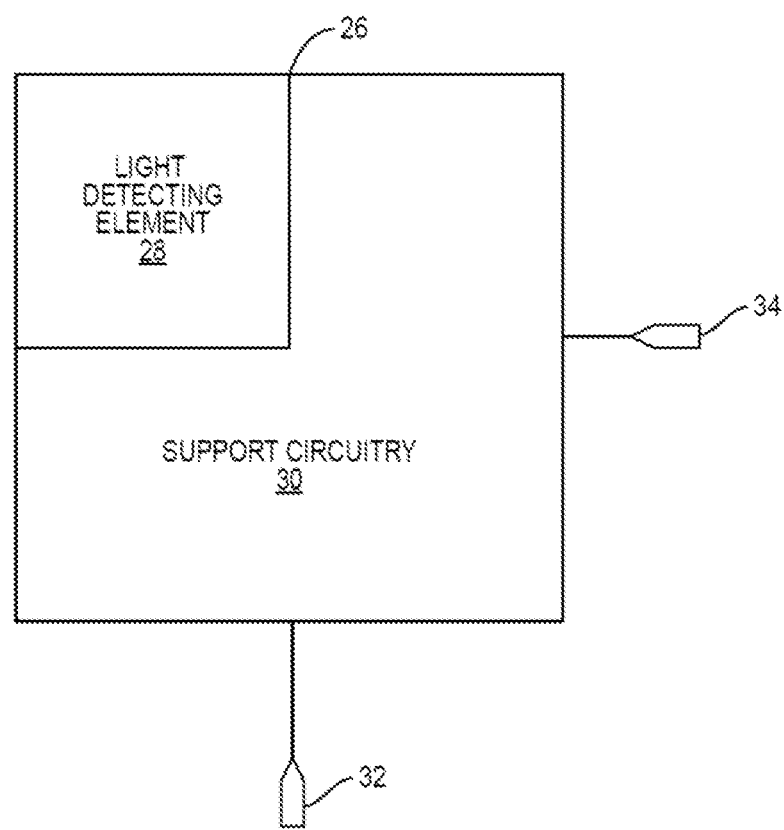
FIG. 2 illustrates a pixel of an active pixel array according to one embodiment of the present disclosure.

FIG. 2 shows details of a pixel 26 in the active pixel array 12 according to one embodiment of the present disclosure. The pixel 26 includes a light detecting element 28 and support circuitry 30. The light detecting element 28 may be a photodiode, photogate, or the like. The support circuitry 30 generally includes one or more switching devices such as transistors that reset and facilitate read out of the pixel 26. One or more select signals provided to a select signal input 32 (from the pixel selection circuitry 16) initiate reset and read out the pixel 26. During a read operation, analog signals indicative of the amount of light detected by the pixel 26 are provided to a column bus output 34, which is coupled to the sampling circuitry 18.

For purposes of discussion herein, the pixel 26 generally operates in one of three states: idle, reset, and read out. In an idle state, photons that collide with the light detecting element 28 dislodge electrons that accumulate in a potential well of the light detecting element 28. The number of electrons that accumulate in the potential well of the light detecting element 28 is proportional to the number of photons that contact the light detecting element 28. In the idle state, the components of the support circuitry 30 remain off. Accordingly, the pixel 26 consumes minimal if any power and dissipates little if any heat in the idle state. The idle state is also referred to as an inactive state herein. During a reset operation, one or more reset switching components (e.g., transistors) in the support circuitry 30 flush out the electrons accumulated in the potential well of the light detecting element 28. Some power is consumed by the one or more reset switching components and thus some heat is generated by the pixel 26 during the reset operation. During a read operation, one or more read out switching elements in the support circuitry are turned on to process and transfer the charge stored in the potential well of the light detecting element 28 (e.g., as a voltage or current) to the column bus output 34. Some power is consumed by the one or more read out switching components and thus some heat is generated by the pixel 26 during the read operation.

Conventionally, all of the pixels in the active pixel array 12 are read out to provide a single image frame from the image sensor 10. Generally, this is done as part of a rolling shutter readout, wherein every pixel in a row of pixels is reset, allowed to remain in an idle state for some amount of time (i.e., the integration time), then read out. This process repeats for each row of pixels until all of the pixels in the active pixel array 12 have been reset and subsequently read out. As the number of rows in an active pixel array 12 increases, the time to capture and read out a single image frame also increases. This may limit the number of image frames that can be captured in a given period of time, known as the frame rate of the image sensor. A limited frame rate may be problematic in some applications. Additionally, the resulting digitized image frame including pixel data for all of the pixels in the active pixel array 12 may be quite large. This may result in increased transfer time of the digitized image frame between the image sensor 10 and external processing circuitry (not shown), as such a transfer is often performed serially. Further, this may result in increased analysis time of the digitized image frame by said external processing circuitry, for example, to detect occupancy in the image frame or a set of image frames. Finally, as discussed above, every reset and read out of a pixel in the active pixel array 12 consumes power and dissipates heat. Over time, continually resetting and reading out every pixel in the active pixel array 12 may raise the temperature of the active pixel array 12. As the temperature of the active pixel array 12 increases, the signal to noise ratio of each one of the pixels therein decreases due to thermal noise. This may make it difficult to analyze the resulting image frame or set of image frames, for example, to detect occupancy.

The inventors of the present disclosure discovered that it is highly inefficient and unnecessary to analyze the entirety of an image frame or set of image frames to detect a transition from an unoccupied state to an occupied state. This is because persons entering the field of view of an image sensor necessarily must first pass through one or more areas within the field of view before being present in other parts of the field of view. For example, for an image sensor in the middle of a room, a person must necessarily pass through an outer edge of the field of view before being present in the center of the field of view. As another example, for an image sensor located in a hallway where the field of view includes the entirety of the area between the two enclosing walls of the hallway, a person must necessarily pass through either the top or the bottom of the field of view before being present in the center of the field of view. As yet another example, for an image sensor with a field of view including the only door to a room and it is known that the room is empty (e.g., due to the absence of occupancy for a given period of time), a person must necessarily pass through the area of the field of view near the door before being present in any other part of the field of view.

Figure 3:
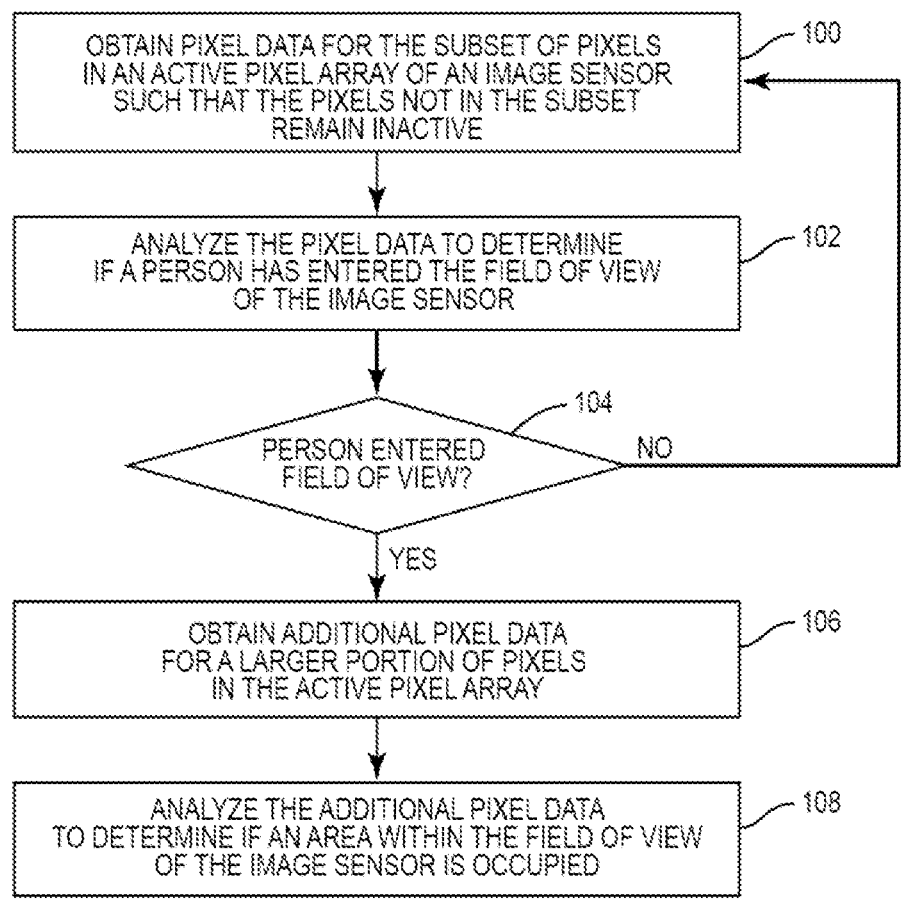
FIG. 3 is a flow diagram illustrating a method for detecting occupancy using an image sensor according to one embodiment of the present disclosure.

Accordingly, FIG. 3 is a flow diagram illustrating a method for detecting occupancy using an image sensor according to one embodiment of the present disclosure. The method starts by obtaining pixel data for a subset of pixels in an active pixel array of an image sensor such that the pixels not in the subset remain inactive (step 100). As discussed herein, when a pixel is inactive or idle, the supporting circuitry therein is off and thus the pixel is consuming minimal if any power and producing minimal if any heat. Accordingly, obtaining the pixel data from the subset of pixels in the active pixel array involves reading out only the subset of pixels while allowing the remaining pixels to remain inactive. Next, the pixel data is analyzed to determine if a person has entered the field of view of the image sensor (step 102). Details regarding analyzing the pixel data to determine occupancy therefrom can be found in FIGS. 9-12B below and U.S. patent application Ser. No. 15/191,753, now U.S. Pat. No. 10,306,738; Ser. No. 15/887,096, now published as U.S. Patent Application No. 2018/0225834; and Ser. No. 15/681,941, now U.S. Pat. No. 10,165,650, the contents of which are hereby incorporated by reference in their entirety. It is then determined if a person has entered the field of view (step 104). If a person has entered the field of view, additional pixel data may optionally be obtained (step 106), where the additional pixel data contains pixel data for a larger portion of pixels in the active pixel array than the subset of pixels. For example, the additional pixel data may contain pixel data for all of the pixels in the active pixel array. Finally, the additional pixel data may be analyzed to determine if an area within the field of view of the image sensor is occupied (step 108). Step 108 may be used as a verification of step 102, or may be used to verify the continuing occupancy of the area within the field of view of the image sensor. Once again, details regarding analyzing the pixel data to determine occupancy therefrom can be found in the above-mentioned patent applications.

By obtaining pixel data for only the subset of pixels in the active pixel array such that the pixels not in the subset remain inactive, the temperature of the active pixel array can be kept much lower than if all of the pixels in the active pixel array were read out. This results in significant improvements in the signal to noise ratio of the pixels within the subset due to a reduction in thermal noise. Such improvements may be significantly evident in environments that are hot and dark, since signal to noise ratios in these environments tend to be highly unfavorable. Further, analyzing the pixel data to determine if a person has entered the field of view of the image sensor is far less computationally expensive due to the reduction in the total amount of pixel data to analyze. Optionally obtaining and analyzing the additional pixel data may improve the reliability of detecting occupancy in this manner.

By choosing the subset of pixels in the active pixel array wisely, the efficacy of detection of a person entering the field of view of the image sensor can be very high. Notably, the subset of pixels may be chosen such that all of the pixels within the subset reside in a single contiguous area or such that the pixels within the subset are located in separate, discrete areas. In embodiments in which the pixels within the subset reside in a single contiguous area, such a contiguous area may be defined by a polygon containing any number of sides, and at least five sides (i.e., a non-rectangular shape) in some embodiments.

Figure 4:
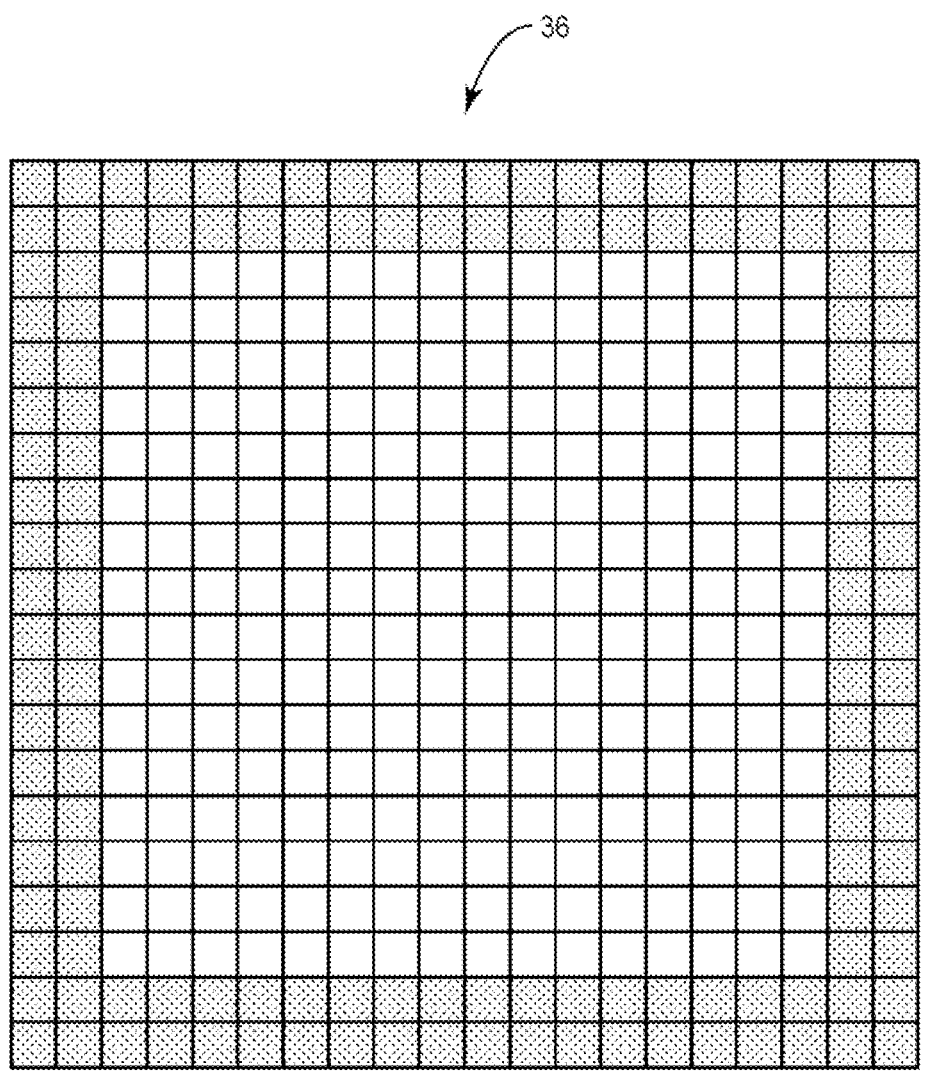
FIG. 4 illustrates a read out pattern for an active pixel array according to one embodiment of the present disclosure.

In one embodiment, the subset of pixels is chosen such that they reside along an outer border of the active pixel array as illustrated in FIG. 4. Specifically, FIG. 4 illustrates an exemplary readout pattern 36 for an active pixel array in which only the pixels along the outer edges of the active pixel array (illustrated by a group of shaded pixels) are read out, while the remaining pixels along the interior of the active pixel array remain inactive or idle. A person entering the field of view of an image sensor will necessarily first pass through an outer edge of the field of view before arriving in any other portion thereof. Accordingly, by analyzing pixel data from only the pixels in an area along the outer edges of the active pixel array, one can easily detect persons entering the field of view of the camera using only a subset of the pixels therein.

Figure 5:
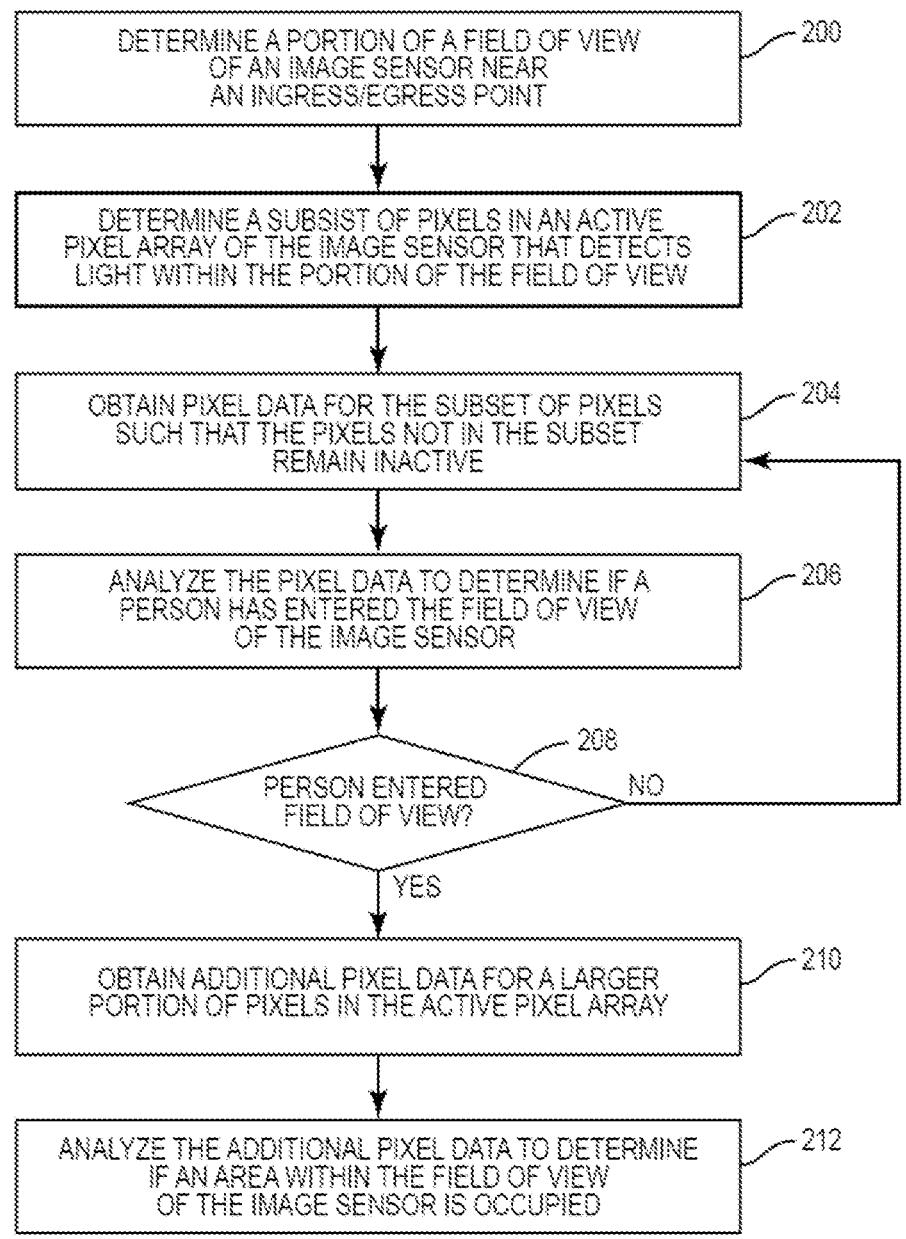
FIG. 5 is a flow diagram illustrating a method for detecting occupancy using an image sensor according to one embodiment of the present disclosure.

In some embodiments, it may be desirable to choose the subset of pixels such that it resides around or near one or more ingress and/or egress points within the field of view of the image sensor. Accordingly, FIG. 5 is a flow diagram illustrating a method for detecting occupancy using an image sensor according to an additional embodiment of the present disclosure. The method starts by determining a portion of a field of view of an image sensor that is near an ingress and/or egress point (step 200). The ingress and/or egress point may be a door, a hallway, or the like. In general, the ingress and/or egress point is one that a person must travel through in order to gain access to the remaining portion of the field of view. Next, a subset of pixels in an active pixel array that detect light in the area near the ingress and/or egress point is determined (step 202). This may involve a simple mapping of an area of the field of view to corresponding pixels in the active pixel array that detect light within this area. Next, pixel data is obtained from the subset of pixels in the active pixel array such that the pixels not in the subset remain inactive (step 204). As discussed herein, when a pixel is inactive, the supporting circuitry therein is off and thus the pixel is consuming minimal if any power and producing minimal if any heat. Accordingly, obtaining the pixel data from the subset of pixels in the active pixel array involves reading out only the subset of pixels while allowing the remaining pixels to remain inactive. The pixel data is then analyzed to determine if a person has entered the field of view of the image sensor (step 206). Once again, details regarding analyzing the pixel data to determine occupancy therefrom can be found in the above-mentioned patent applications. If a person has entered the field of view, additional pixel data may optionally be obtained (step 208), where the additional pixel data contains pixel data for a larger portion of pixels in the active pixel array than in the subset of pixels. For example, the additional pixel data may contain pixel data for all of the pixels in the active pixel array. Finally, the additional pixel data may be analyzed to determine if an area within the field of view of the image sensor is occupied (step 210). Step 210 may be used as a verification of step 206, or may be used to verify the continuing occupancy of the area within the field of view of the image sensor. Once again, details regarding analyzing the pixel data to determine occupancy therefrom can be found in the above-mentioned patent applications.

Figure 6A:
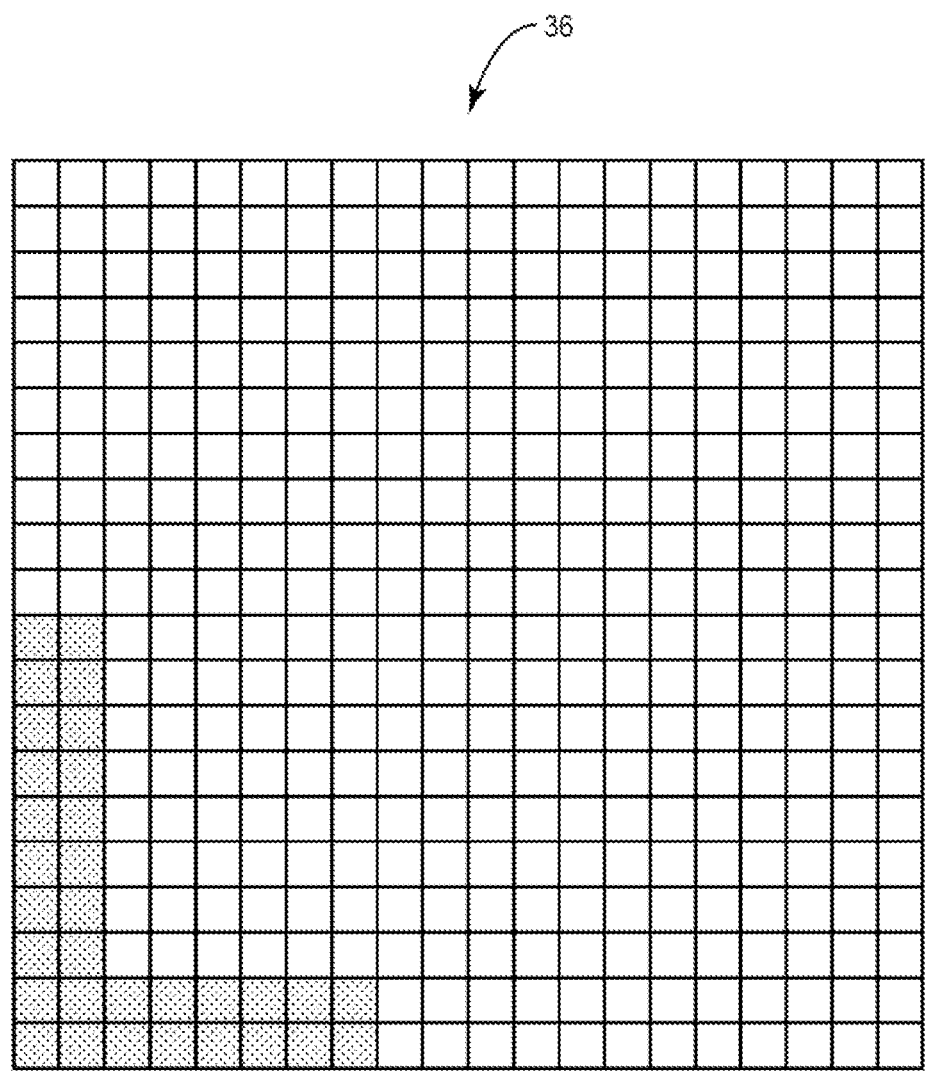
FIGS. 6A through 6C illustrate read out patterns for an active pixel array according to various embodiments of the present disclosure.
Figure 6B:
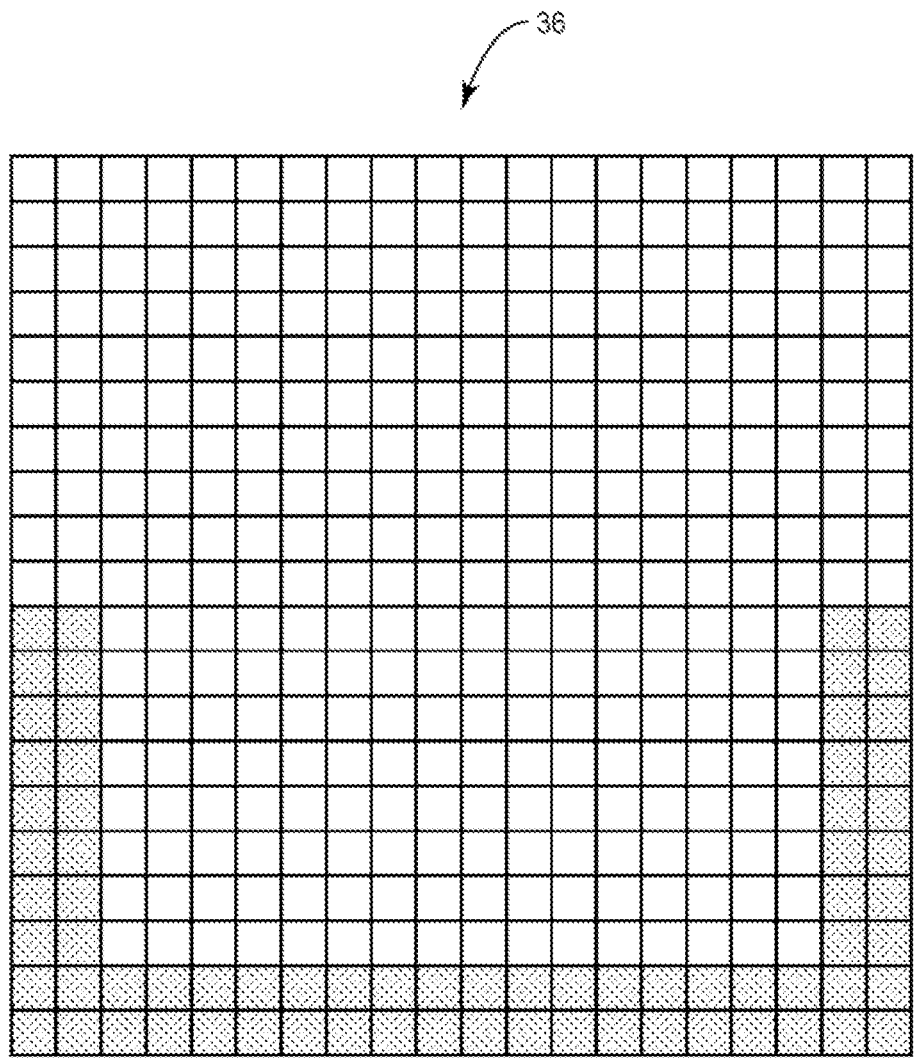

FIGS. 6A and 6B illustrate exemplary readout patterns 36 for an active pixel array according to various embodiments of the present disclosure. With respect to FIG. 6A, only those pixels in the lower left corner of the active pixel array (illustrated by a group of shaded pixels) are read out, while the remaining pixels are inactive or idle. Such a pattern may be effective, for example, when there is only one ingress and/or egress point to the field of view of the image sensor (e.g., a door leading to a room in which the image sensor is located) and it is in the lower left corner thereof. Notably, the subset of pixels forms a polygon including six sides. As discussed above, the subset of pixels may be chosen to occupy an arbitrary area defined by a polygon having any number of sides.

With respect to FIG. 6B, only those pixels along a lower left edge, lower bottom edge, and lower right edge of the active pixel array (forming a "U" shape) are read out, while the remaining pixels are inactive or idle. Such a pattern may be effective, for example, when it is known that person must pass through the lower outside edges of the image frame before being present in any other portion of the field of view.

Figure 6C:
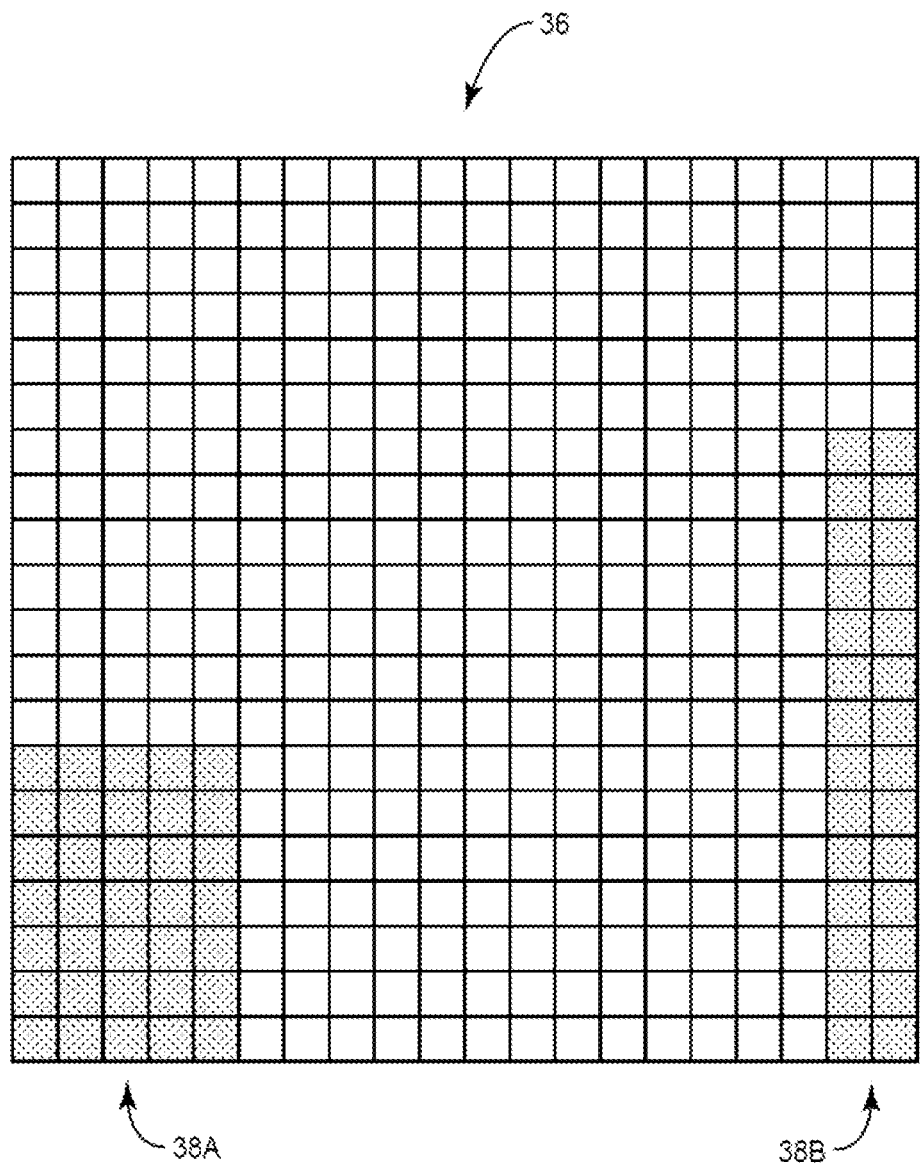

With respect to FIG. 6C, the subset of pixels includes a first region of interest 38A in the lower left corner of the active pixel array and a second region of interest 38B on the right side of the active pixel array. Notably, the first region of interest 38A and the second region of interest 38B are not contiguous. While not shown, the first region of interest 38A and the second region of interest 38B may also be polygons having any number of sides. Further, while only the first region of interest 38A and the second region of interest 38B are shown, the subset of pixels may include any number of separate regions of interest that are either discrete or semi-contiguous without departing from the principles of the present disclosure. The pattern shown in FIG. 6C may be effective, for example, when a person must pass through the lower left side of the field of view or the right side of the field of view before being present in any other portion of the field of view.

Conventional image sensors are not able to read out pixels in an active pixel array in an arbitrary pattern. The image sensor 10 discussed herein may include modifications thereto such that the pixel selection circuitry 16 is capable of selecting pixels in an arbitrary fashion in order to read out only a subset of the pixels in the active pixel array 12 such that the subset includes polygons having any number of sides and/or noncontiguous regions of interest.

The image sensor 10 may further be configured to read out the pixels in the subset of pixels in a continuous fashion such that there are no pauses for pixels that are not being read out. This may require the control circuitry 14 to compute and implement specialized timing for the various parts of the image sensor 10 specific to the subset of pixels such that the pixel data can be properly sampled. Accordingly, the control circuitry 14 may be configured to alter the timing of pixel selection by the pixel selection circuitry 16 in order to provide a proper read out of the subset of pixels. Further, the control circuitry 14 may be configured to change operating parameters of the sampling circuitry 18 and the analog-to-digital converter circuitry in order to properly digitize the pixel data from the subset of pixels. Continuously reading out the subset of pixels without pausing for those pixels that are not being read out may significantly lower read times and thus allow for increases in frame rate above and beyond that which is achievable by a conventional image sensor.

Finally, the control circuitry 14 may be configured to change operating parameters of the output register 22 such that the pixel data for the subset of pixels is properly arranged and thus communicated to external circuitry for analysis. In particular, the image sensor 10 may be configured to capture, store, and facilitate transfer of the pixel data for the subset of pixels as a sparse data structure that does not include reserved spots (i.e., blank spaces) for pixels that are not in the subset of pixels. This may allow for a much smaller data structure to be provided via the output 24, improving transmit times when provided to another device.

Figure 7:
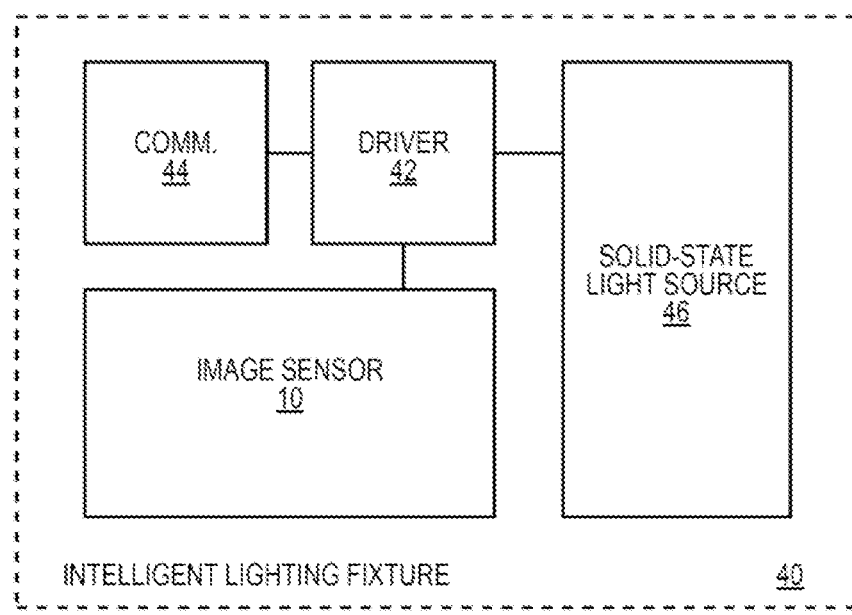
FIG. 7 illustrates an intelligent lighting fixture according to one embodiment of the present disclosure.

The image sensor 10 discussed herein may be incorporated into an intelligent lighting fixture 40 as shown in FIG. 7. The intelligent lighting fixture 40 includes the image sensor 10, driver circuitry 42, communications circuitry 44, and a solid-state light source 46. The driver circuitry 42 is coupled to the image sensor 10, the communications circuitry 44, and the solid-state light source 46. The driver circuitry 42 may use the communications circuitry 44 to communicate with other devices such as other lighting fixtures within a distributed lighting network. Further, the driver circuitry 42 may control one or more light output parameters (e.g., brightness, color temperature, color rendering index, and the like) of the solid-state light source by providing one or more driver signals thereto. Finally, the driver circuitry 42 may obtain and analyze pixel data from the image sensor according to the methods discussed above with respect to FIG. 3 and FIG. 5 to determine and react to occupancy. By using pixel data for only a subset of pixels in the active pixel array 12 of the image sensor 10, the processing resources of the driver circuitry 42 may be significantly conserved. This may in turn lead to reduced power consumption of the lighting fixture 40, reduced cost due to the reduced processing requirements of the driver circuitry 42, and improved longevity of the driver circuitry 42.

Figure 8:
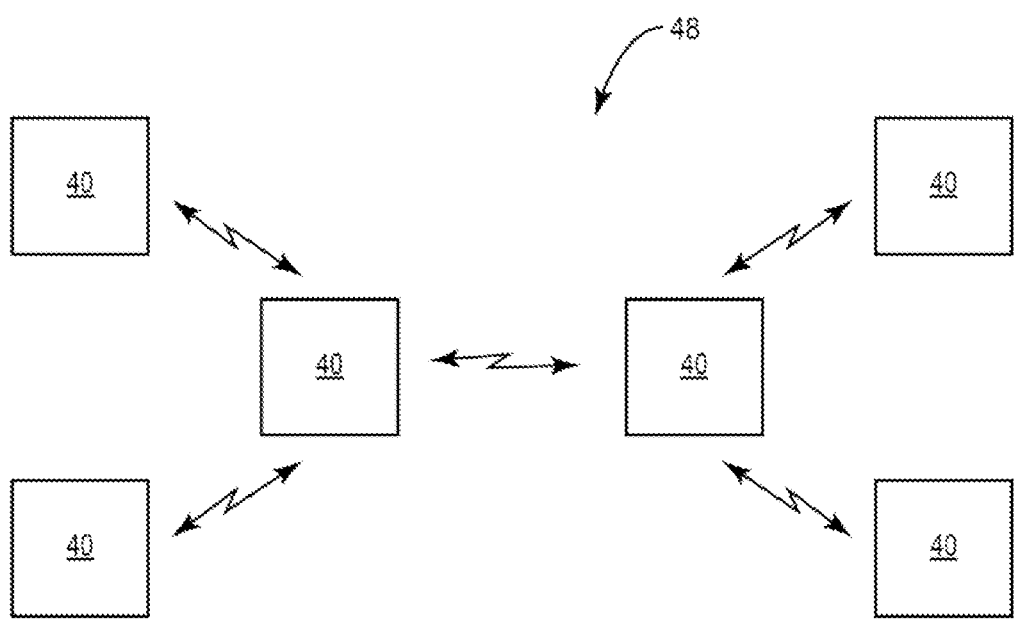
FIG. 8 illustrates an intelligent lighting network according to one embodiment of the present disclosure.

The intelligent lighting fixture 40 may be one of many intelligent lighting fixtures 40 in an intelligent lighting network 48, as shown in FIG. 8. The intelligent lighting fixtures 40 may communicate with one another in order to provide certain functionality such as responding to occupancy events. Each one of the intelligent lighting fixtures 40 may be configured to detect occupancy using the image sensor 10 as discussed above. However, each one of the intelligent lighting fixtures 40 may be configured with a different read out pattern for the active pixel array 12 of the image sensor 10, such that the subset of pixels used to determine occupancy is different for different ones of the intelligent lighting fixtures 40.

In one embodiment, the intelligent lighting fixtures 40 may be configured to save processing resources by only requiring certain ones of the lighting fixtures 40 to detect occupancy when a space is unoccupied. In particular, those intelligent lighting fixtures 40 where a field of view of the image sensor 10 thereof includes an ingress and/or egress point to a space in which the intelligent lighting fixtures 40 are located may be tasked with detecting occupancy when the space is currently unoccupied, while the remaining intelligent lighting fixtures 40 are not required to do so. Those lighting fixtures 40 where a field of view of the image sensor 10 thereof does not include an ingress and/or egress point to the space do not need to detect occupancy when the space is currently unoccupied, because a person cannot enter the space without first passing through an ingress and/or egress point thereto. When occupancy is detected by one of the intelligent lighting fixtures 40 tasked with detecting occupancy, the remaining intelligent lighting fixtures 40 may begin to detect occupancy as well in order to verify occupancy or more accurately or precisely determine occupancy.

Of those intelligent lighting fixtures 40 that are tasked with detecting occupancy in the intelligent lighting network 48 when the space is currently unoccupied, they may utilize the methods discussed above wherein only a subset of pixels in the active pixel array 12 of the image sensor 10 are used for doing so. The read out patterns for each one of the lighting fixtures 40 may be configured to accurately detect occupancy with minimal processing overhead as discussed above. The read out patterns may be determined by persons familiar with the space and programmed into the intelligent lighting fixtures 40, or may be determined by the intelligent lighting fixtures 40 themselves or a device in the intelligent lighting network 48 with access to sensor data from the intelligent lighting fixtures 40, for example, using learning algorithms.

Figure 9:
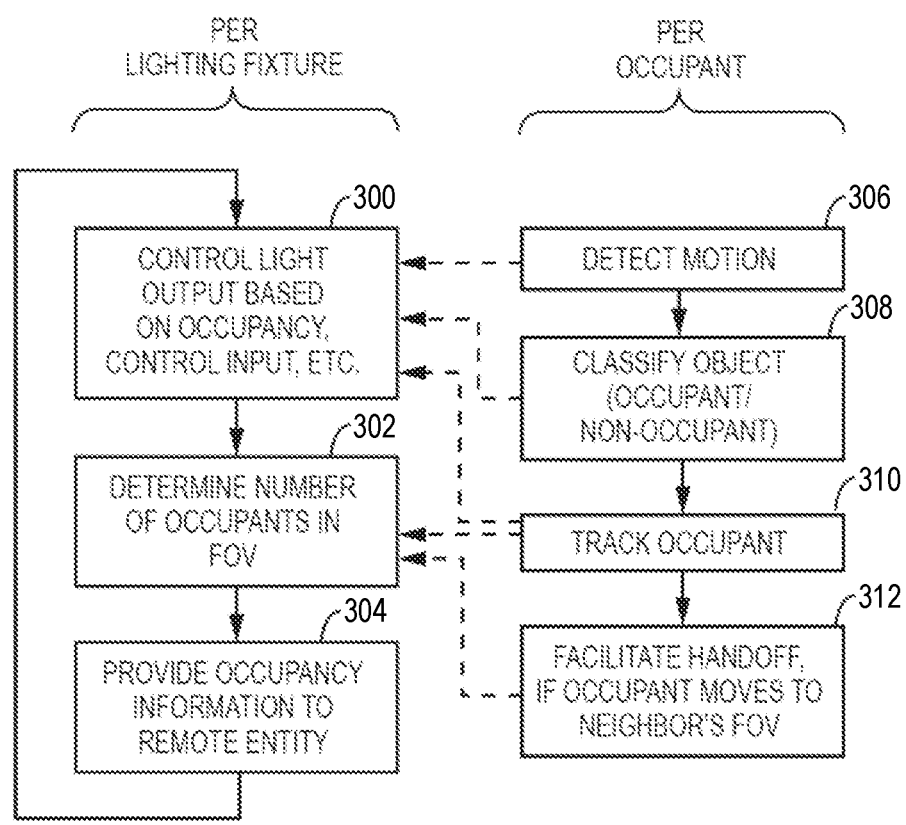
FIG. 9 is a flow diagram illustrating operation of a lighting fixture according to one embodiment.

Turning now to FIG. 9, a flow diagram is provided to illustrate both the general operation of each intelligent lighting fixture 40 as well as tracking of occupants within a given environment. Each intelligent lighting fixture 40 will control its light output for general illumination based on information or instructions provided by other entities and/or sensors (step 300). For example, light output may be controlled, such as being turned on, turned off, or dimmed to a desired level, based on information received from one or any combination of an associated wall controller, control node, system controller, processing node, other lighting fixture, and the like.

In addition to providing light for general illumination, each intelligent lighting fixture 40 is configured to determine the number of occupants in the associated field of view (step 302) and provide occupancy information, based on the number of occupants in the associated field of view, to a remote entity, such as the system controller, control node, processing node, and the like (step 304). In essence, the occupancy information for a given intelligent lighting fixture 40 generally corresponds to the number of occupants within the lighting fixture's field of view. Based on the occupancy information for the intelligent lighting fixture 40 in a given area, the number of occupants for the given area may be calculated by summing the number of occupants that are in the fields of view for each of the lighting fixtures in the given area. In certain embodiments, steps are taken to avoid redundantly counting an occupant that resides in multiple fields of view at the same time. Details are provided further below.

As indicated above, controlling the light output (step 300), determining the number of occupants in an associated field of view (step 302), and providing occupancy information to a remote entity (step 304), are provided on a fixture-by-fixture basis. Each intelligent lighting fixture 40 uses the associated image sensor 10 to track occupants on a per occupant basis. As such, one or more occupants may be tracked by a given intelligent lighting fixture 40 at any given time. In one embodiment, the intelligent lighting fixture 40 will use its sensors to detect motion caused by a moving object in the associated field of view (step 306) and classify the object as either an occupant or non-occupant (step 308). An occupant is considered as a person (human), while a non-occupant is generally considered an object, or anything other than a person. If an object is classified as an occupant, the occupant is tracked while the occupant remains in the associated field of view (step 310).

When the occupant moves or is predicted to move outside of the associated field of view, the intelligent lighting fixture 40 will coordinate with neighboring intelligent lighting fixtures 40 to facilitate a handoff of the occupant tracking to the neighboring intelligent lighting fixture 40 that provides a field of view to which the occupant has moved or is predicted to move (step 312). The detection, classification, tracking, and handoff steps 306-312 may provide information that is helpful when both controlling the light output (step 300) as well as determining the number of occupants in the field of view of a given intelligent lighting fixture 40 (step 302). In essence, as occupants are detected in or leave the associated field of view, the intelligent lighting fixture 40 will dynamically update and report on the total number of occupants in its associated field accordingly. Again, occupants within the associated field of view of a particular intelligent lighting fixture 40 may be tracked on an individual basis, where the intelligent lighting fixture 40 may track multiple occupants at any given time.

Figure 10:
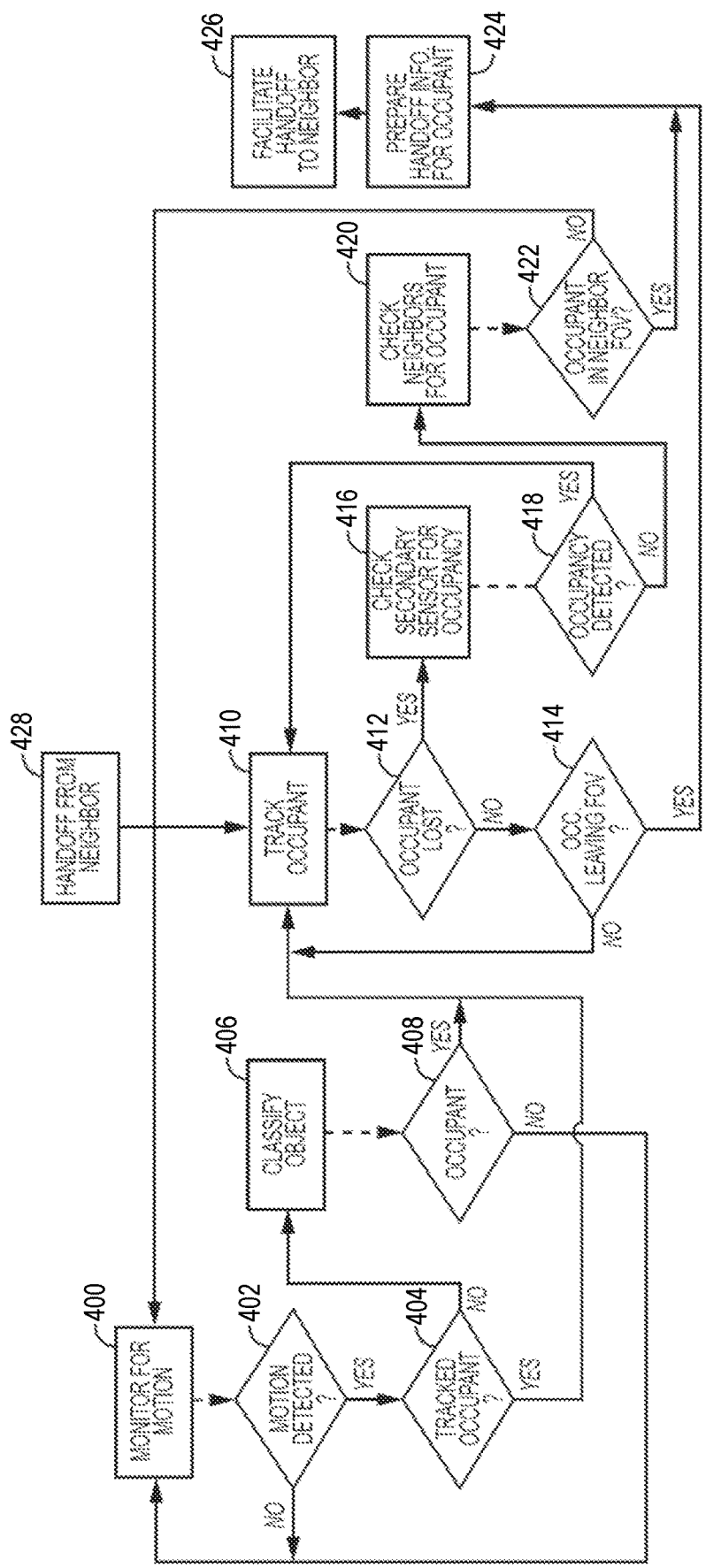
FIG. 10 is a flow diagram illustrating occupant detection, classification, tracking, and handoff for a given lighting fixture according to one embodiment.

FIG. 10 is a flow diagram illustrating how individual occupants are detected and tracked within a given lighting fixture's field of view using the image sensor 10 and/or a passive infrared (PIR)-based occupancy sensor. The image sensor 10 is used for high-resolution detection, classification and tracking of occupants within a field of view for the associated intelligent lighting fixture 40. The PIR-based occupancy sensor is used for low-resolution occupancy detection. As such, various other types of sensors, such as acoustic, thermal, image, and the like may be employed for a sensor. It is assumed that control electronics and associated software of the intelligent lighting fixture 40 use information gathered from the image sensor 10 and/or additional sensors, and perhaps neighboring intelligent lighting fixtures 40, to provide the following functionality. Those skilled in the art will recognize that such functionality may be integrated within or distributed among various hardware and/or software components of one or more intelligent lighting fixtures 40 and associated devices.

The process starts when the intelligent lighting fixture 40 analyzes information provided by one or both of the image sensor 10 and the PIR-based occupancy sensor to monitor for motion caused by the movement of an object within the lighting fixture's field of view or general vicinity (step 400). If motion is not detected (step 402), the intelligent lighting fixture 40 will continue to monitor for motion (step 400). If motion is detected (step 402), the intelligent lighting fixture 40 will analyze information provided by the image sensor 10 in an effort to determine if the object is an occupant who has previously been detected and is currently being tracked (step 404). Motion detection employs the use of one or more sensors. As an example for an image sensor 10, the intelligent lighting fixture 40 will analyze captured image information to detect motion. For a PIR-based occupancy sensor, the intelligent lighting fixture 40 will receive an output indicative of motion within the sensor's field of view. The intelligent lighting fixture 40 may process the information from various sensors to detect or otherwise identify motion.

If the object is not an occupant who is currently being tracked, the intelligent lighting fixture 40 will analyze the information provided by the image sensor 10 to classify the object as either an occupant or a non-occupant, where an occupant is a person and a non-occupant is an inanimate object (step 406). Those skilled in the art will recognize various schemes to classify an object. Examples include histogram of oriented gradients (HOG) schemes, which use machine learning to classify object appearance and shape. Incorporation of Principal Components Analysis (PCA) into the HOG schemes provide for particularly robust and reproducible classification of occupants and groups of occupants. HOG-based classification is viewed as sufficiently robust, yet not overly computationally burdensome for a lighting application. If even greater accuracy is required, the use of sparse convergent neural networks (SCNN) may be employed; however, the use of SCNN may require more microprocessor memory and/or speed than HOG-based schemes. The SCNN scheme seeks to reduce the complexity of established neural network schemes, thereby reducing response time and computation resources even in visually complex environments.

If the object is a non-occupant (step 408), the intelligent lighting fixture 40 will continue to monitor for motion (step 400). If the object is an occupant (step 408), the intelligent lighting fixture 40 will analyze the information provided by the image sensor 10 to track the occupant within the field of view associated with the image sensor 10 (step 410). The function of tracking may range from simply determining that the occupant is within the field of view to determining one or more of a precise location within the field of view, a direction of travel, and a velocity of travel, wherein the direction and velocity of travel may be represented with an appropriate vector that is associated with a direction and magnitude, which corresponds to velocity.

The intelligent lighting fixture 40 may also analyze the information received from the image sensor 10 to identify one or more physical characteristics associated with the occupant, such as shape, size, colors, patterns, and the like. These characteristics are helpful for re-identifying an occupant when tracking is lost within the lighting fixture's field of view, recognizing that the occupant is a single occupant when the occupant resides in an area where the fields of view from adjacent intelligent lighting fixtures 40 overlap, and handing off tracking of an occupant from one intelligent lighting fixture 40 to another when the occupant moves from one lighting fixture's field of view and to another.

The tracking function may employ various tracking schemes, including Kalman filtering, which provides a streamlined and effective technique for persistently tracking objects.

When motion is detected and the object detected is a previously tracked occupant (step 404), the intelligent lighting fixture 40 may skip the steps of classifying the object (steps 406 and 408), since the object is already known as an occupant, and move directly to tracking the occupant (step 410). As indicated above, this situation may occur when an occupant has not left the field of view for the intelligent lighting fixture 40, but tracking is lost for some reason. As the occupant moves within the field of view, the intelligent lighting fixture 40 will detect motion associated with the occupant moving (step 402), analyze information provided by the image sensor 10, and recognize that the object is a previously tracked occupant based on the analysis of the information provided by the image sensor 10 (step 404).

While tracking an occupant, the intelligent lighting fixture 40 may be configured to detect when tracking is lost for the occupant (step 412) as well as detect or predict that the occupant is leaving the field of view (step 414) for the intelligent lighting fixture 40. Assuming tracking for the occupant is not lost (step 412) in that the occupant has not left or is not leaving the field of view for the intelligent lighting fixture 40, tracking will continue (step 410). If tracking for the occupant is lost (step 412), the intelligent lighting fixture 40 may be configured to check information from a second sensor, which in this embodiment is PIR-based occupancy sensor, and determine whether or not occupancy is being detected via the second sensor (step 416). If the information from the second sensor indicates that occupancy is still being detected (step 418), the intelligent lighting fixture 40 will continue trying to track the occupant (step 410).

If the information from the second sensor indicates that occupancy is not detected (step 418), the intelligent lighting fixture 40 will communicate with adjacent intelligent lighting fixtures 40 that provide neighboring fields of view to that provided by the intelligent lighting fixture 40 (step 420). The interaction between neighboring lighting fixtures may take many forms. For example, the intelligent lighting fixture 40 may ask its neighbors if any occupants have recently appeared in their fields of view from the field of view of the intelligent lighting fixture 40. The intelligent lighting fixture 40 may also provide its neighbors with recent information bearing on one or more of recent location, direction, velocity, and physical characteristics of the lost occupant and the neighbors will compare the information provided by the intelligent lighting fixture 40 with any occupants currently being tracked by the neighbors.

If a determination is made that the lost occupant is not in the neighbor's field of view (step 422), the intelligent lighting fixture 40 reverts back to monitoring for motion (step 400). At this point, the intelligent lighting fixture 40 is able to recognize the lost occupant if the occupant is once again detected in the lighting fixture's field of view. Notably, the intelligent lighting fixture 40 is always monitoring the field of view for new objects that could be occupants when the process repeats.

If a determination is made that the lost occupant is in the neighbor's field of view (step 422), the intelligent lighting fixture 40 will provide any handoff information necessary for handing off tracking of the lost occupant to the neighbor that has picked up the occupant in its field of view (step 424) and then facilitate handoff of the occupant to the neighbor (step 426). The handoff information may include a combination of location, direction, velocity, and physical characteristics of the lost occupant. This list is not inclusive, and those skilled in the art will recognize other pertinent information that may be helpful in various embodiments. Kalman filtering or the like may be used to facilitate handoffs.

Returning to step 414, another trigger for handing off tracking of an occupant to the neighbor is when the intelligent lighting fixture 40 is actively tracking the occupant (step 410) and predicts, or determines, that the occupant is leaving the lighting fixture's field of view (step 414). If the intelligent lighting fixture 40 can identify the neighbor toward which the occupant is moving, the intelligent lighting fixture 40 will prepare the handoff information for the occupant (step 424) and communicate with the neighbor to share the handoff information and facilitate the handoff (step 426). If the intelligent lighting fixture 40 cannot identify the neighbor toward which the occupant is moving, the intelligent lighting fixture 40 will prepare the handoff information for the occupant and communicate with other intelligent lighting fixtures 40 in the lighting network N1 to look for an occupant entering their fields of view. A neighbor receiving the occupant may acknowledge receipt of the occupant and increase its occupancy count to account for the new occupant in its field of view. The intelligent lighting fixture 40 will reduce its occupancy count to account for having an occupant leave its field of view.

Step 428 indicates that a handoff of an occupant from a neighbor may enter the process at the tracking phase (step 410); however, other embodiments may bring in an occupant that is being handed off from a neighbor at any other point in the process.

FIGS. 11A through 11F illustrate imagery of a single field of view (FOV) derived from an image sensor 10 at six points in time (t1-t6). In this example, two occupants, person P1 and person P2, as well as one non-occupant object N, are present at one time or another in the field of view. Throughout the progression, person P1 enters the field of view from the left, progresses from left to right through the field of view, and exits the field of view on the right. Using information collected from the image sensor 10, the intelligent lighting fixture 40 employs a first process to detect and determine that the person P1 is an occupant for occupancy purposes as well as track person P1 as she enters, progresses through, and exits the field of view.

Figure 11C:
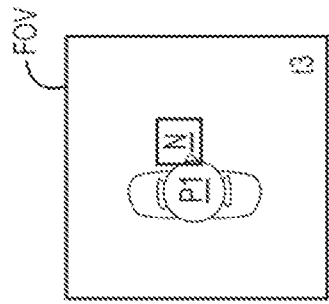
FIGS. 11A through 11F illustrate movement of occupants through an exemplary field of view.
Figure 11B:
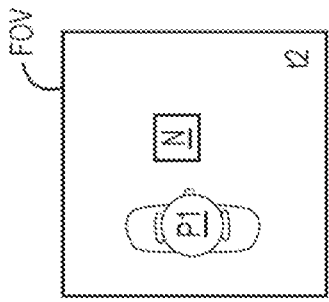
Figure 11A:
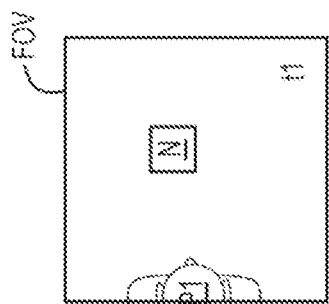
Figure 11F:
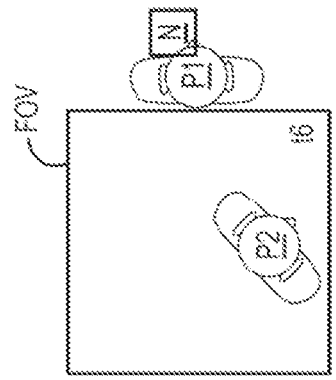
Figure 11E:
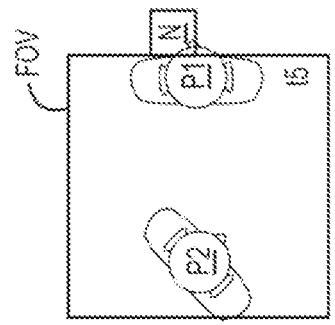
Figure 11D:
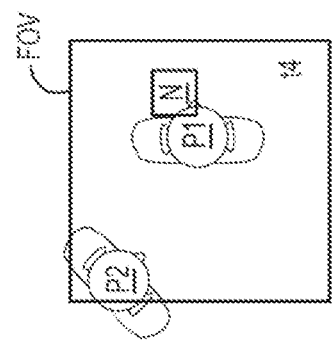

Using the same information collected from the image sensor 10, the intelligent lighting fixture 40 employs a second process to detect the movement of the non-occupant object N, once the non-occupant object N begins moving at time t3 (FIG. 11C). Based on the collected information, the intelligent lighting fixture 40 will be able to determine that the non-occupant object N is not an occupant for occupancy purposes. Using information collected from the image sensor 10, the intelligent lighting fixture 40 employs a third process to detect and determine that the person P2 is an occupant for occupancy purposes as well as track person P2 as he enters and diagonally progresses through the field of view.

The intelligent lighting fixture 40 will update its occupancy count accordingly as persons P1 and P2 enter and leave the field of view (FOV). The presence or movement of the non-occupant object N will not affect the occupancy count. The intelligent lighting fixture 40 will report the occupancy information periodically or as it changes to a remote entity, such as a system controller, control node, processing node, or the like, which may take appropriate action based on the occupancy information or a change in the occupancy information.

When there are overlapping fields of view provided by the various intelligent lighting fixtures 40, logic trees may be developed to recognize and act on movement of occupants through the borders (periphery) of the various fields of view with neighboring intelligent lighting fixtures 40 being notified of imminent occupant arrival based on their position relative to the reporting intelligent lighting fixture 40. In one embodiment, handoff logic is developed to effectively handle the case where an occupant resides in an overlapping portion of two fields of view by incorporating probabilistic weighting to define which intelligent lighting fixture 40 "owns," and thus should account for, the occupant.

Figure 12B:
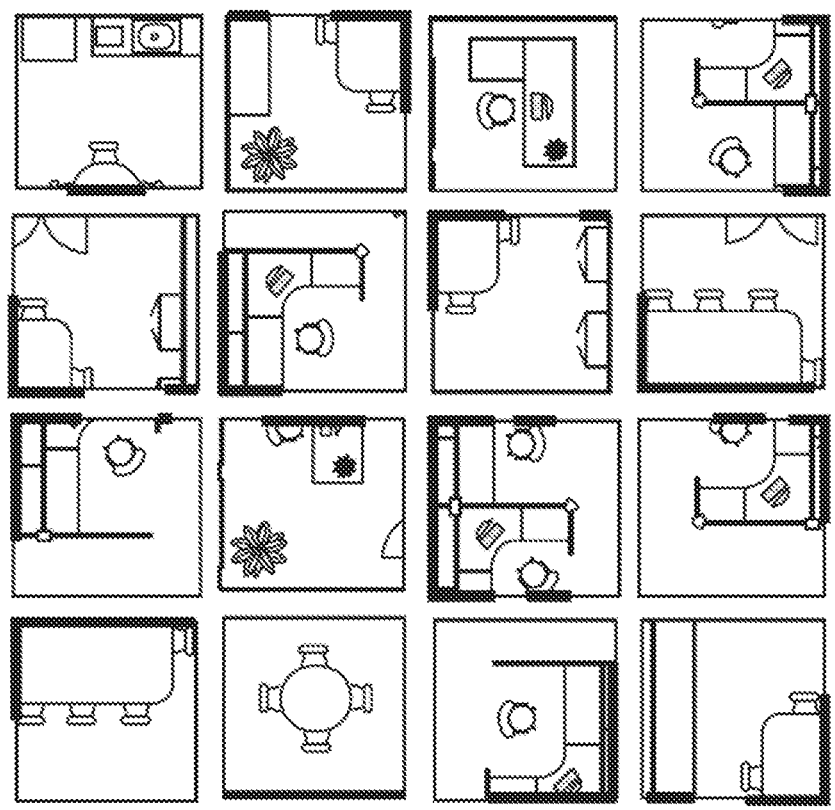
FIG. 12B illustrates fields of view after a mapping operation.
Figure 12A:
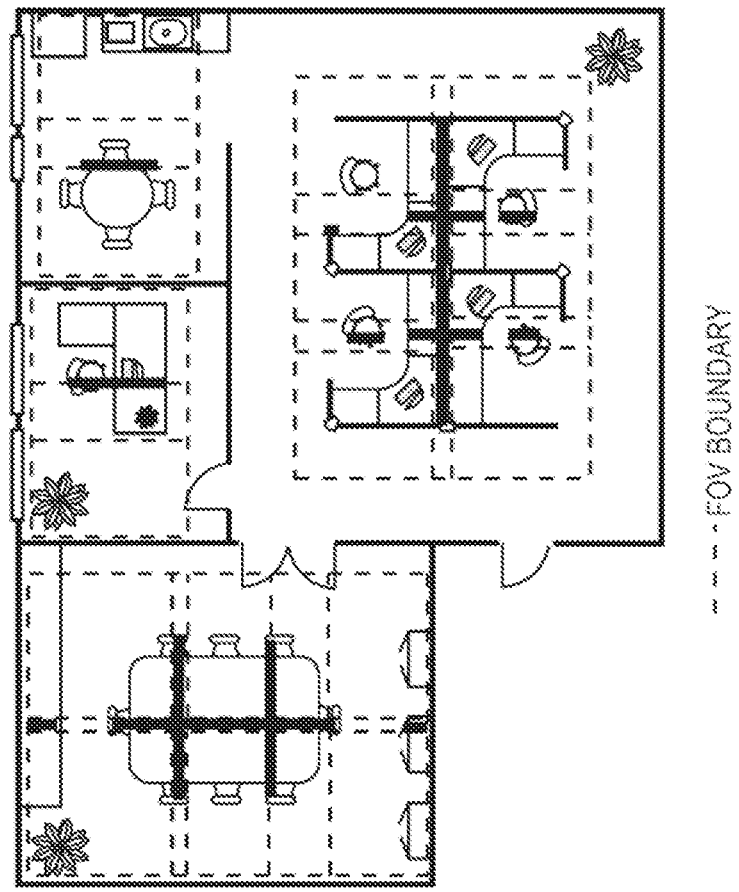
FIG. 12A illustrates fields of view prior to a mapping operation.

When determining overall occupancy for a particular space, identifying the intelligent lighting fixtures 40 that are within the space as well as the relative location of the intelligent lighting fixtures 40 in space is very helpful in maintaining accurate occupancy accounts for the space. FIG. 12A illustrates an office environment that has a conference room, two offices, and a cubicle area having four cubicles. Each dashed square represents the field of view of an overhead intelligent lighting fixture 40. As illustrated, many of the fields of view of the lighting fixtures can overlap with one another.

As graphically presented in FIG. 12A, the rooms in which the intelligent lighting fixtures 40 are located as well as the relationships, or relative locations, of intelligent lighting fixtures 40 within the office environment are clearly depicted. However, when the intelligent lighting fixtures 40 are installed, neither the intelligent lighting fixtures 40 nor any remote entities that may control or receive information from them are able to discern location or relationship information without automated or manual mapping of some form. FIG. 12B graphically represents the fact that when initially installed, intelligent lighting fixtures 40 are essentially randomly located and oriented. During a commissioning process, a user may employ a remote entity, such as a control node 36, to access the fields of view for the various intelligent lighting fixtures 40 and map them according to their orientation and location throughout the office environment. The user may also assign the intelligent lighting fixtures 40 to occupancy groups, based on the particular space in which the intelligent lighting fixtures 40 reside. For example, the conference room occupancy group will have six intelligent lighting fixtures 40, the occupancy group for each of the offices will include two intelligent lighting fixtures 40, and the occupancy group for the cubicle area will include six intelligent lighting fixtures 40.

Depending on the capabilities of the system, the user may be able to precisely map and orient intelligent lighting fixtures 40, such that each intelligent lighting fixture 40 may be provided with sufficient information to identify the other intelligent lighting fixtures 40 that are within the particular occupancy group of the intelligent lighting fixture 40, those neighboring intelligent lighting fixtures 40 that are immediately adjacent the intelligent lighting fixture 40, the role of the position of the neighboring intelligent lighting fixtures 40 relative to the intelligent lighting fixture 40, and the like. As such, each intelligent lighting fixture 40 may be provided with information identifying the occupancy group within which it resides, the neighboring intelligent lighting fixtures 40 that are immediately adjacent other intelligent lighting fixtures 40, and a relative location of the neighboring intelligent lighting fixtures 40. This information is particularly helpful for the tracking and handoff functions, which were described above.

The mapping process may be automated to varying degrees. In a highly automated embodiment, a processing node or the like will collect image information from the various intelligent lighting fixtures 40, analyze the content and/or characteristics of the image information, and create a map of the intelligent lighting fixtures 40 as described above and graphically represented in FIG. 12A. During such a process, the image analysis may identify objects, patterns, colors, light intensities, lighting gradients, and the like in an effort to piece the fields of view into a cohesive map. In this particular example, portions of the perimeter of the fields of view that are likely to include helpful alignment cues, such as walls, bisected objects, and the like, and are highlighted in bold. These portions of the perimeter the fields of view include walls, objects that span fields of view, and the like.

Those skilled in the art will recognize improvements and modifications to the preferred embodiments of the present disclosure. All such improvements and modifications are considered within the scope of the concepts disclosed herein and the claims that follow.

What is claimed is:

1. An intelligent lighting fixture comprising:
a solid-state light source;
an image sensor comprising:
an active pixel array comprising a plurality of pixels; and
image sensor control circuitry configured to:
operate in a first mode of operation wherein the image sensor control circuitry is configured to perform read operations only on a subset of the plurality of pixels such that the plurality of pixels that are not in the subset of the plurality of pixels remain inactive; and
operate in a second mode of operation wherein the image sensor control circuitry is configured to perform a read operation on all of the plurality of pixels; and
driver circuitry configured to:
control one or more light output parameters of the solid-state light source;
when the image senor control circuitry operates in the first mode of operation, obtain pixel data for the subset of the plurality of pixels from the image sensor;
analyze the pixel data to classify an object detected by the image sensor as an occupant or a non-occupant; and
in response to classifying the object as an occupant, cause the image sensor control circuitry to operate in the second mode of operation.

2. The intelligent lighting fixture of claim 1 wherein the subset of the plurality of pixels comprises a first region of interest and a second region of interest that is noncontiguous with the first region of interest.

3. The intelligent lighting fixture of claim 1 wherein the driver circuitry is further configured to analyze the pixel data to track the object within an environment captured by the image sensor.

4. The intelligent lighting fixture of claim 3 wherein the driver circuitry is further configured to communicate with a neighboring intelligent lighting fixture in response to classifying the object as the occupant.

5. The intelligent lighting fixture of claim 4 wherein the driver circuitry is further configured to handoff tracking to the neighboring intelligent lighting fixture in response to determining the occupant has entered a field of view of the neighboring intelligent lighting fixture.

6. The intelligent lighting fixture of claim 1 wherein the subset of the plurality of pixels is defined by a polygon having at least 5 sides.

7. The intelligent lighting fixture of claim 6 wherein the driver circuitry is further configured to analyze the pixel data to track the occupant within an environment captured by the image sensor.

8. The intelligent lighting fixture of claim 1 wherein the subset of the plurality of pixels is defined by a rectangular area along one or more outside edges of the active pixel array.

9. The intelligent lighting fixture of claim 8 wherein the subset of the plurality of pixels forms a frame around the one or more outside edges of the active pixel array such that the plurality of pixels that are not in the subset of the plurality of pixels form a rectangle that is inset within the subset of the plurality of pixels.

10. The intelligent lighting fixture of claim 1 wherein each one of the plurality of pixels comprises:
a light detecting element configured to transform light into an analog signal; and
supporting circuitry configured to:
during a read operation, process the analog signal from the light detecting element to provide a processed analog signal and provide the processed analog signal to downstream circuitry in the image sensor; and
remain inactive when a read operation is not occurring.

11. The intelligent lighting fixture of claim 1 wherein each one of the plurality of pixels generates more heat during a read operation than when a read operation is not occurring.

12. The intelligent lighting fixture of claim 1 wherein each one of the plurality of pixels consumes more power during a read operation than when a read operation is not occurring.

13. The intelligent lighting fixture of claim 1 wherein noise within the subset of the plurality of pixels is lower in the first mode of operation than in the second mode of operation.

14. The intelligent lighting fixture of claim 1 wherein the image sensor control circuitry is configured to capture and store pixel data from the subset of the plurality of pixels in a sparse data structure such that only the pixel data from the subset of the plurality of pixels is included in the sparse data structure.

15. The intelligent lighting fixture of claim 14 wherein the image sensor control circuitry is configured to facilitate a transfer of the sparse data structure to a remote device.

16. The intelligent lighting fixture of claim 1 wherein the image sensor control circuitry is further configured to:
in the first mode of operation, analyze the pixel data to determine if a person has entered a field of view of the image sensor; and
transition to the second mode of operation when the person has entered the field of view of the image sensor.

17. A method for detecting occupancy by an intelligent lighting fixture comprising an image sensor, the method comprising:
obtaining pixel data from the image sensor by performing read operations only on a subset of pixels in an active pixel array of the image sensor such that pixels in the active pixel array that are not in the subset of pixels remain inactive; and
analyzing the pixel data to classify an object detected by the image sensor as an occupant or a non-occupant; and
in response to classifying the object as an occupant, obtaining additional pixel data from the image sensor by performing a read operation on all pixels in the active pixel array of the image sensor.

18. The method of claim 17 wherein each one of the pixels generates more heat during a read operation than when a read operation is not occurring.

19. The method of claim 17 wherein each one of the pixels consumes more power during a read operation than when a read operation is not occurring.

20. The method of claim 17 wherein the subset of pixels is defined by a rectangular area along one or more outside edges of the active pixel array.

21. The method of claim 20 wherein the subset of pixels in the active pixel array forms a frame around the one or more outside edges of the active pixel array such that the pixels in the active pixel array that are not in the subset of pixels form a rectangle that is inset within the subset of pixels.

22. The method of claim 17 wherein:
a field of view of the image sensor includes one of an ingress point and an egress point to a space in which the image sensor is located; and the subset of pixels is located in the active pixel array such that a person entering or leaving the space via one of the ingress point and egress point will be detected by the subset of pixels.

23. The method of claim 17 further comprising analyzing the additional pixel data to verify that an area within a field of view of the image sensor is occupied.

24. The method of claim 17 further comprising analyzing the additional pixel data to determine if an area within a field of view of the image sensor remains occupied.

* * * * *